(12) United States Patent
Piasecki

(10) Patent No.: US 10,967,963 B2
(45) Date of Patent: Apr. 6, 2021

(54) TANDEM RIGID ROTOR SYSTEM AND METHOD

(71) Applicant: Dragonfly Pictures, Inc., Essington, PA (US)

(72) Inventor: Michael W. Piasecki, Haverford, PA (US)

(73) Assignee: Dragonfly Pictures, Inc., Essington, PA (US)

(*) Notice: Subject to any disclaimer, the term of this patent is extended or adjusted under 35 U.S.C. 154(b) by 395 days.

(21) Appl. No.: 15/278,636

(22) Filed: Sep. 28, 2016

(65) Prior Publication Data
US 2017/0297687 A1 Oct. 19, 2017

Related U.S. Application Data

(60) Provisional application No. 62/233,491, filed on Sep. 28, 2015.

(51) Int. Cl.
*B64C 27/08* (2006.01)
*B64C 1/06* (2006.01)
*B64C 19/00* (2006.01)
*B64C 1/00* (2006.01)

(52) U.S. Cl.
CPC .............. *B64C 27/08* (2013.01); *B64C 1/061* (2013.01); *B64C 1/065* (2013.01); *B64C 19/00* (2013.01); *B64C 2001/0072* (2013.01)

(58) Field of Classification Search
CPC . B64C 27/08; B64C 19/00; B64C 2001/0072; B64C 2201/024; B64C 2201/108
See application file for complete search history.

(56) References Cited

U.S. PATENT DOCUMENTS

| | | | | |
|---|---|---|---|---|
| 9,045,226 B2* | 6/2015 | Piasecki | ............... | G05D 1/102 |
| 9,393,847 B2* | 7/2016 | Piasecki | ............... | G05D 1/102 |
| 9,499,263 B2* | 11/2016 | Youngblood | ......... | B64C 39/024 |
| 9,610,817 B1* | 4/2017 | Piasecki | ............... | G05D 1/102 |
| 9,764,829 B1* | 9/2017 | Beckman | ............... | B64C 15/14 |
| 9,944,389 B2* | 4/2018 | Piasecki | ............... | G05D 1/102 |
| 10,239,615 B2* | 3/2019 | Duru | ..................... | B64C 27/20 |
| 2011/0226892 A1* | 9/2011 | Crowther | ............... | B64C 15/02 |
| | | | | 244/17.23 |

(Continued)

OTHER PUBLICATIONS

"IO Drones, Opensource Autonomous Vehicles", https://drotek.com/io-drones-opensource-autonomous-vehicles/ (pub'd Jan. 10, 2018, accessed Jan. 17, 2019), 5 pages.

*Primary Examiner* — Philip J Bonzell
(74) *Attorney, Agent, or Firm* — Riverside Law LLP

(57) ABSTRACT

A tandem rigid rotor system has a first rigid rotor system and a second rigid rotor system connected by a fuselage. The fuselage has at least one framing member connected between the first rigid rotor system and the second rigid rotor system, such that the framing member is torsionally flexible for controlling yaw of the tandem rigid rotor system. In certain embodiments, multiple framing members are connected between the first rigid rotor system and the second rigid rotor system in parallel. In certain embodiments, the torsional flexibility allows up to 20 degrees of movement away from the lateral axis. In certain embodiments, framing members are vertically and laterally rigid.

11 Claims, 5 Drawing Sheets

(56) References Cited

U.S. PATENT DOCUMENTS

| | | | |
|---|---|---|---|
| 2011/0315806 A1* | 12/2011 | Piasecki | G05D 1/102 244/2 |
| 2015/0217613 A1* | 8/2015 | Piasecki | G05D 1/102 701/2 |
| 2016/0137298 A1* | 5/2016 | Youngblood | B64C 39/024 244/17.23 |
| 2016/0340035 A1* | 11/2016 | Duru | B64C 27/20 |
| 2017/0096221 A1* | 4/2017 | Piasecki | G05D 1/102 |
| 2017/0210469 A1* | 7/2017 | Piasecki | G05D 1/102 |
| 2017/0297705 A1* | 10/2017 | Youngblood | B64C 39/024 |
| 2018/0281944 A1* | 10/2018 | Piasecki | G05D 1/102 |

* cited by examiner

TANDEM RIGID ROTOR SYSTEM AND METHOD

CROSS-REFERENCE TO RELATED APPLICATIONS

This application claims priority to U.S. provisional application No. 62/233,491 filed on Sep. 28, 2015 incorporated herein by reference in its entirety.

BACKGROUND OF THE INVENTION

Rotor systems are used along with a controller to provide the lift and directional control necessary to fly a helicopter. Rotor systems have developed with increasing complexity over time. Some of the most common types of rotor systems include rigid, semi-rigid and fully articulated systems. These systems facilitate various types of movement of the rotor blades, and as the number of movements allowed by the system increases, the complexity of the rotor system also increases. Generally, the types of movements available for a rotor blade includes feathering which is a twisting or pitching of the blade about the pitch axis to change lift, flapping which is an upward and downward movement of the blade, and lead/lag which allows the blade tip to seek forward and backwards along the tip plane. Rigid rotor systems are fairly simple systems that actuate rotor blades to feather. In rigid systems, the blade roots are rigidly attached to the hub of the rotor, and the blades are relatively flexible to accommodate loads by bending. Semi-rigid rotor systems are more complex, and have mechanisms for actuating rotor blade feathering and flapping. Fully articulated rotor systems typically allow control and actuation of rotor blade feathering, flapping, lead and lag. Although not as complex as semi-rigid or fully articulated rotor systems, the advantages of rigid rotors are well established. Rigid rotors are less complex having fewer parts, are easier to maintain, and are less expensive than the more complex rotor designs. Rigid rotors also provide a high and crisp control response for greater agility and control of power.

Yaw control is a directional flight control that is fundamental for proper application of the rotor systems described above, and it controls the left or right nose rotation of the helicopter in flight about the helicopter's vertical yaw axis. Traditionally, for single rigid rotor helicopters, yaw control is directed through the utilization of a tail rotor. However, tandem rotor helicopters, which have a front and back set of rotor blades, do not have a tail rotor to control yaw. Instead, tandem rotor helicopters typically rely on fully articulating rotor systems for controlling yaw through a concept known as differential cyclic. To provide yaw control during flight, differential cyclic is implemented by tilting the front and back rotor blades in opposite directions, which turns the nose of the helicopter by spinning the helicopter about its center axis. While not as agile as a rigid rotor, the fully articulating rotor heads have three hinges per rotor blade that act to provide yaw control, while also reducing oscillating loads on the rotor. Although conventional tandem systems utilizing fully articulating rotor heads can produce adequate thrust vectoring for rotating the aircraft and maintain overall flight control, fully articulating rotor heads are more complex, have more parts, are more expensive to buy or build, and are difficult to maintain. In addition, fully articulating rotor heads are less responsive, less agile, and provide less control than rigid rotors systems.

In addition, tandem rotor helicopters are more susceptible to fuselage fatigue. Tandem rotor helicopters are typically designed with a very stiff fuselage because torque forces from each of the tandem rotors transfers down to the fuselage, resulting in a twisting force that is exerted on the fuselage structure. Conventional fuselage materials and geometries are designed to strengthen the fuselage so that it is rigid and it will withstand any tendency for torque forces to twist the frame. In tandem rotor helicopter design, one issue involved with substituting fully articulated rotors with rigid rotors is that is that rigid rotors would twist the fuselage of the aircraft rather than changing the resultant thrust vector of the rotor planes. The twisting forces would cause structural fatigue in the fuselage, which can have a catastrophic effect after repeated fatigue cycles on the fuselage over a period of time.

The lack of yaw authority and the issues surrounding structural fatigue have previously prevented the use of rigid rotors on a tandem rotor helicopters. Thus, what is needed in the art is a tandem rigid rotor system and method that is capable of controlling yaw while maintaining the structural integrity of the fuselage.

SUMMARY OF THE INVENTION

According to at least one embodiment, a tandem rigid rotor system includes a first rigid rotor system including multiple rotor blades; a second rigid rotor system including multiple rotor blades; a control system configured to control the speed and feather of the multiple rotor blades and the multiple rotor blades; and a fuselage including at least one framing member connecting the first rigid rotor system and the second rigid rotor system, where the at least one framing member is torsionally flexible such that the torsional flexibility permits controlling yaw of the tandem rigid rotor system. In one embodiment, the at least one framing member remains substantially rigid vertically and laterally. In one embodiment, the fuselage includes first and second framing members connecting the first rigid rotor system and the second rigid rotor system, where the first and second framing members are positioned substantially in parallel to each other, and where the first and second framing members are torsionally flexible such that the torsional flexibility is sufficient for controlling yaw of the tandem rigid rotor system. In one embodiment, the fuselage includes a third framing member connecting the first rigid rotor system and the second rigid rotor system, where the third framing member is positioned substantially in parallel to each of the first and second framing members, and where the first, second and third framing members are torsionally flexible such that the torsional flexibility is sufficient for controlling yaw of the tandem rigid rotor system. In one embodiment, the first, second and third framing members remain substantially rigid vertically and laterally. In one embodiment, the first and second framing members are substantially coplanar, and where a cross section of the first, second and third framing members forms a substantially triangular relationship. In one embodiment, the torsional flexibility allows at least 6 degrees of movement away from a lateral axis of the tandem rigid rotor system. In one embodiment, the torsional flexibility allows at least 12 degrees of movement away from the lateral axis. In one embodiment, the torsional flexibility allows at least 20 degrees of movement away from the lateral axis. In one embodiment, the at least one framing member includes a composite material. In one embodiment, the at least one framing member includes a first material and a second material. In one embodiment, the second material has a higher torsional flexibility than the first material. In one embodiment, the second material has a higher concentration than the first material along portions of the at least one framing member. In one embodiment, the at least one framing member includes a first section and a second section joined at a mechanical element configured to provide torsional flexibility. In one embodiment, the at least one framing member is a hollow tube. In one embodiment, the tandem rigid rotor system includes first, second and third body panels; where the first body panel covers a majority of the fuselage, where the second body panel covers a portion of the first rotor system, where the third body panel covers a portion of the second rotor system, and where the first, second and third body panels move independently of each other such that torsional flexibility of the fuselage is not restricted from controlling the yaw. In one embodiment, the multiple rotor blades and the multiple rotor blades are substantially coplanar and are synchronized. In one embodiment, the multiple rotor blades and the multiple rotor blades lie in different planes and are asynchronous.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 2A shows an embodiment of a tandem rigid rotor system having a single framing member, FIG. 2B shows an embodiment of a tandem rigid rotor system having dual framing members, FIG. 2C shows an embodiment of a tandem rigid rotor system having first, second and third framing members where the second framing member has a different geometry, FIG. 2D shows an embodiment of a tandem rigid rotor system having first, second and third framing members where the first and second framing members are substantially coplanar below the centered third framing member, forming a triangular relationship.

FIG. 3A shows front and rear rotor planes parallel to the lateral axis for generating no yaw. FIG. 3B shows front and rear rotor planes tilted in opposite directions with respect to the lateral axis for generating yaw in a leftward direction. FIG. 3C shows a front rotor plane out of plane and a rear rotor plane parallel to the lateral axis for generating a combination of roll and yaw.

FIG. 4A is a framing member composed of a single uniform composite, FIG. 4B is a framing member composed of a first and second material having different torsional flexibilities, and FIG. 4C is a framing member having two sections joined at a mechanical member that allows for torsional flexibility.

DETAILED DESCRIPTION OF THE INVENTION

Figure 1A:
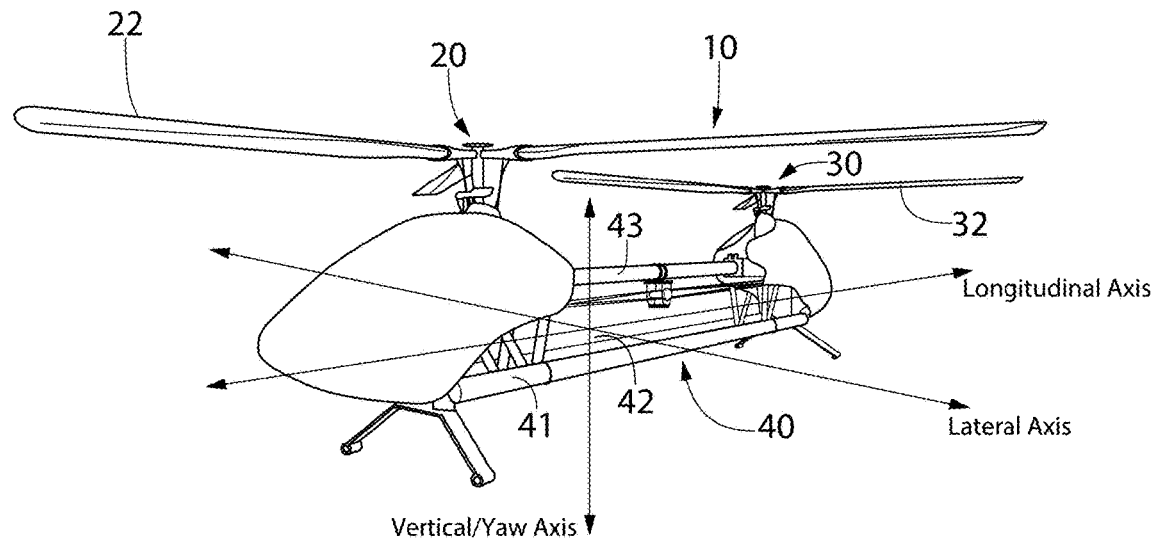
FIG. 1A is a perspective view of a tandem rigid rotor system according to an exemplary embodiment.

It is to be understood that the figures and descriptions of the present invention have been simplified to illustrate elements that are relevant for a more clear comprehension of the present invention, while eliminating, for the purpose of clarity, many other elements found in rigid rotor systems, tandem rotor systems and flight control methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to6 should be considered to have specifically disclosed subranges such as from 1 to3, from 1 to4, from 1 to5, from 2 to4, from 2 to6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a tandem rigid rotor system and a method of controlling a tandem rigid rotor system in flight.

Figure 1B:
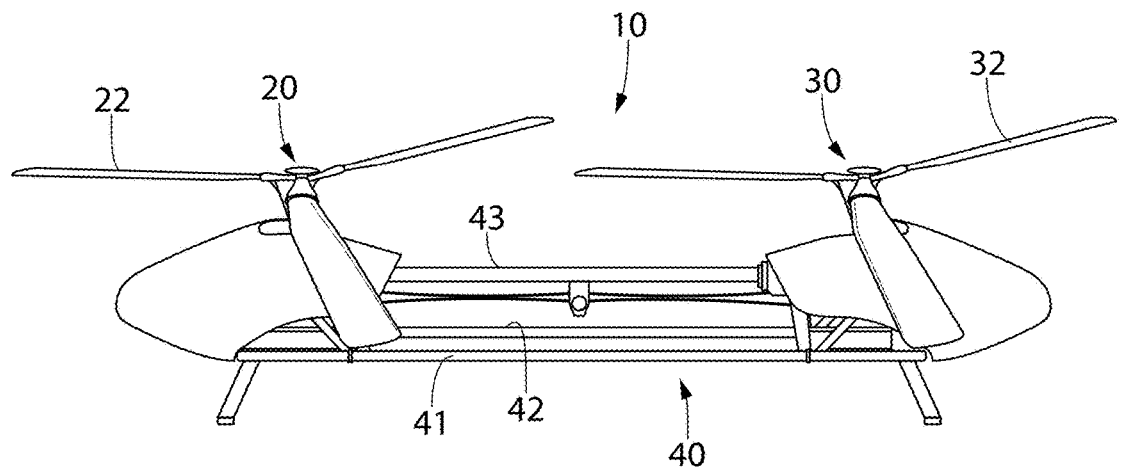
FIG. 1B is an alternate perspective side view of the tandem rigid rotor system according to the embodiment shown in FIG. 1A.

With reference now to the exemplary embodiment shown in FIGS. 1A and 1B, a tandem rigid rotor system 10 has a first rigid rotor system 20 and a second rigid rotor system 30. The first rigid rotor system 20 has a set of rotor blades 22 attached, and likewise, the second rigid rotor system 30 has its own set of rotor blades 32. The rigid rotor systems 20, 30 are structurally connected by a fuselage 40, which in this case includes first 41, second 42 and third 43 framing members. In certain embodiments, the framing members are longerons, hollow tubes, or solid tubes. The embodiment shown in FIGS. 1A and 1B has three framing members, with first and second framing members 41, 42 coplanar at the bottom, and a third framing member 43 centered above the first and second 41, 42 framing members, forming a triangular configuration. All three framing members of the fuselage 40 are arranged in parallel to each other, which facilitates the torsional flexibility required to control yaw of the tandem rigid rotor system 10 in flight. The fuselage can include any other housing components as desired, provided they do not structurally interfere with the functionality of the framing members.

Figure 2A:
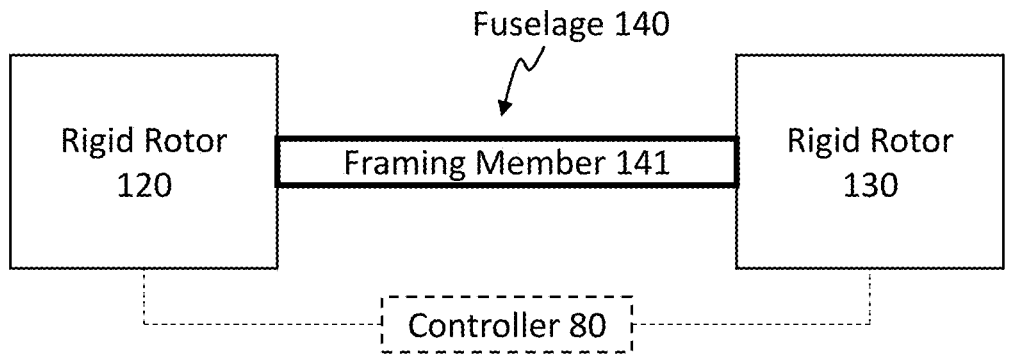
FIGS. 2A-2D are diagrams of tandem rigid rotor systems having framing member configurations according to various exemplary embodiments.
Figure 2B:
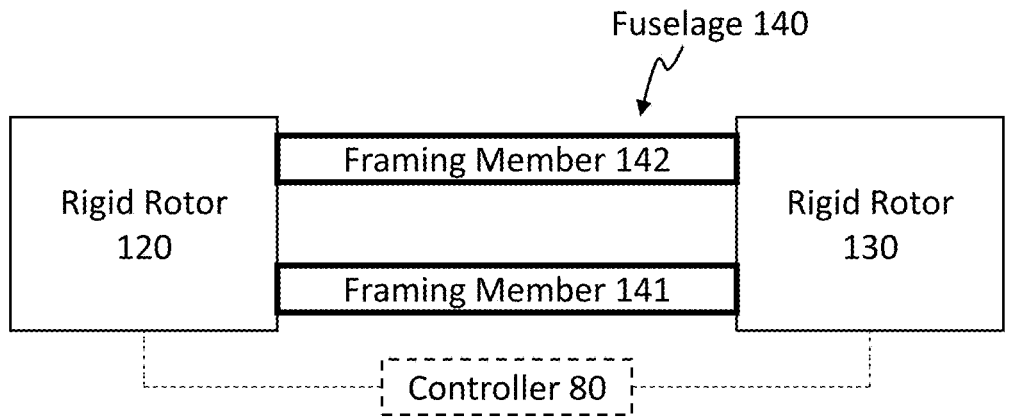
Figure 2C:
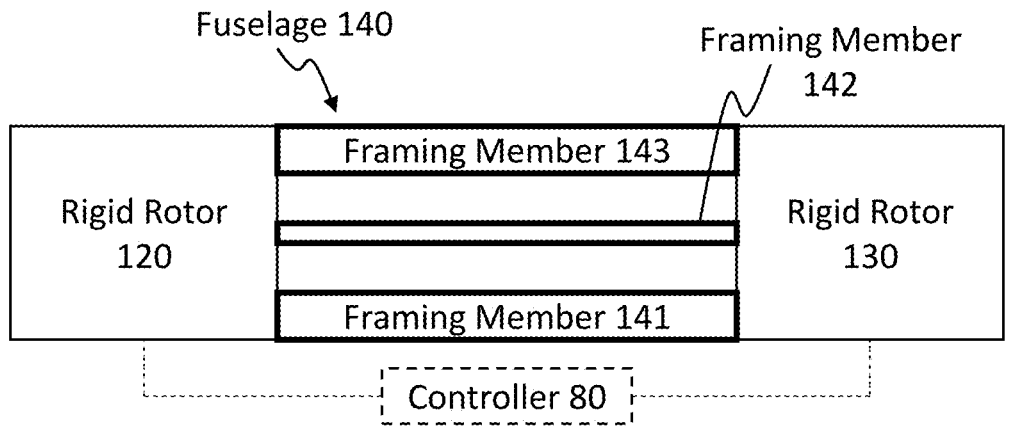
Figure 2D:
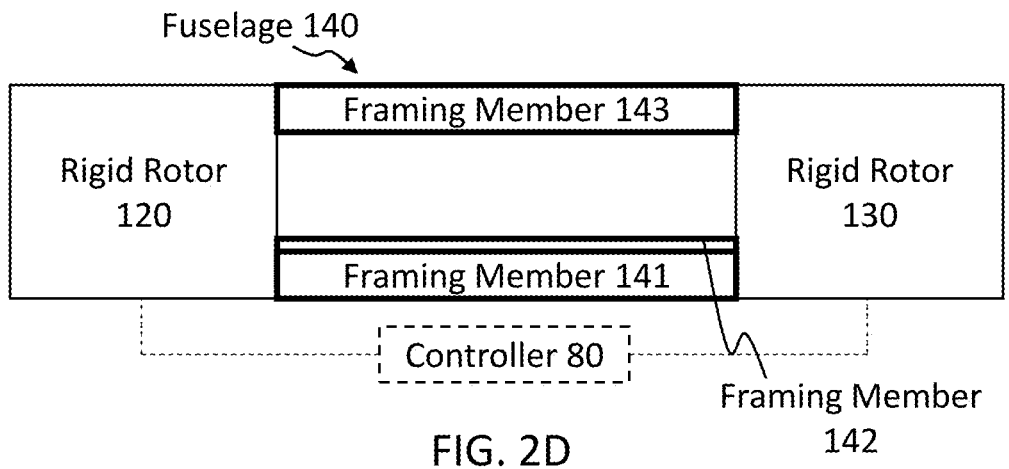

As shown in FIGS. 2A-2D, different configurations of the fuselage 140 can include different numbers and configurations of framing members for connecting the first rigid rotor system 120 to the second rigid rotor system 130. For example, in certain embodiments, the fuselage 140 has a singular framing member 141, as shown in FIG. 2A. A control system 80 is electrically coupled to the first and second rigid rotor systems 120, 130 for manipulating the rotor blades and controlling the tandem rotors in either an asynchronous or synchronous fashion as a system. In certain embodiment, the framing member 141 is torsionally flexible, while remaining vertically and laterally rigid. In certain embodiments, the fuselage has a first framing member 141 and a second framing member 142 arranged in parallel to each other, as shown in FIG. 2B. The first and second framing members 141, 142 can be coplanar in either one of a vertically or laterally oriented plane, or can lie in different planes. Framing members do not have to be the same size, shape, or composition. In the exemplary embodiment shown in FIG. 2C, first, second and third framing member 141, 142, 143 are arranged in parallel to each other along a common vertical plane. The second framing member 142 is of a smaller cross sectional geometry than the first and third framing members 141, 143, and he first and third framing members 141, 143 also have a higher torsional flexibility. The fuselage remains overall vertically and laterally rigid. In another embodiment shown in FIG. 2D, which is similar to the exemplary embodiment of FIGS. 1A and 1B, the first and second framing members 141, 142 are coplanar along a lateral plane at the bottom of the fuselage 140, while the third framing member 143 is centered above the first and second framing members 141, 142 in a triangular fashion. In certain embodiments, the fuselage has 1, 2, 3, 4, 5, 6 or more framing members that in certain embodiments, all run parallel to each other. In certain embodiments, the fuselage framing members are not uniform in geometry or material composition, and provide different levels of torsional flexibility, which can vary based on the position of the framing member within the fuselage.

Figure 3A:
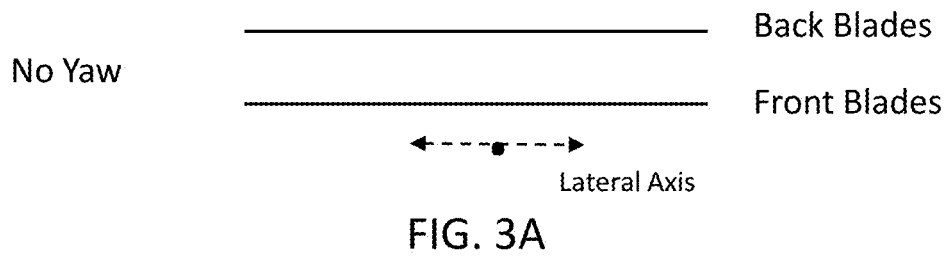
FIGS. 3A-3C are diagrams of a head-on view of the front of a tandem rigid rotor system.
Figure 3B:
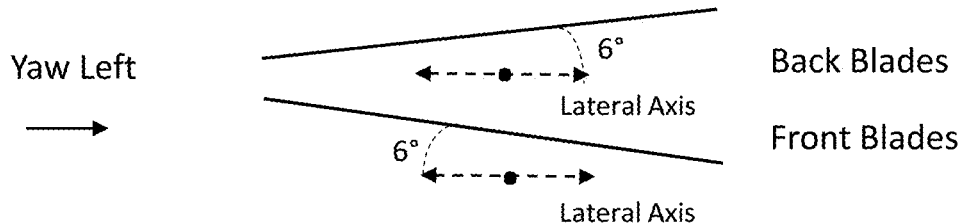
Figure 3C:
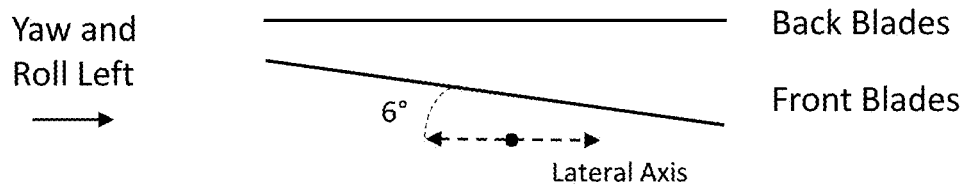

The framing members and fuselage provide torsional flexibility so that one or both of the rigid rotor systems 120, 130 can twist away from the lateral axis, generating a left or right yaw of the tandem rigid rotor system. The diagrams in FIGS. 3A and 3B illustrate a head-on view of the front of a tandem rigid rotor system, showing front and rear rotor blades, and their movement for generating no yaw and leftward yaw according to one embodiment. As shown in FIG. 3A, the front and rear rotor blades are generally parallel to the lateral axis as no yaw is being generated. As the front rotor blade tilts out of plane with the lateral axis, and the rear rotor blade tilts out of plane with the lateral axis in an opposite direction, in this case 6 degrees as shown in FIG. 3B, the front nose of the helicopter starts to yaw to the left. A similar tilt out of plane for the front and rear blades in the opposite direction will generate yaw to the right. In certain embodiments, both of the rotor blades tilt out of plane with the lateral axis in opposing directions. The roll and yaw contributions to the rear rotor plane tilt are equal and opposite in this case, leaving the plane parallel to the lateral axis. In certain embodiments, only one of the rotor blades tilts out of plane with the lateral axis, generating yaw and roll. As shown in FIG. 3C, a front rotor blade is tilted with respect to the lateral axis. This is a result of a combination of yaw and roll commands to the left. In certain embodiments, the flexibility of the fuselage allows for up to 6 degrees of movement away of the lateral axis. Certain embodiments may also allow for up to 20 degrees of movement away from the lateral axis. Fuselage torsion can also be restricted past a certain degree, such as 20 degrees, to avoid any unwanted aerodynamic effects. Certain embodiments allow torsional movement past 20 degrees. In certain embodiments, the front and back rotor blades are coplanar and synchronized. In certain embodiments, the front and back rotor blades lie and different planes (e.g. the back rotor blades sit at a higher plane than the front rotor blades) and can operate asynchronously. The number of rotor blades can vary, as would be understood by those having ordinary skill in the art.

Figure 4A:
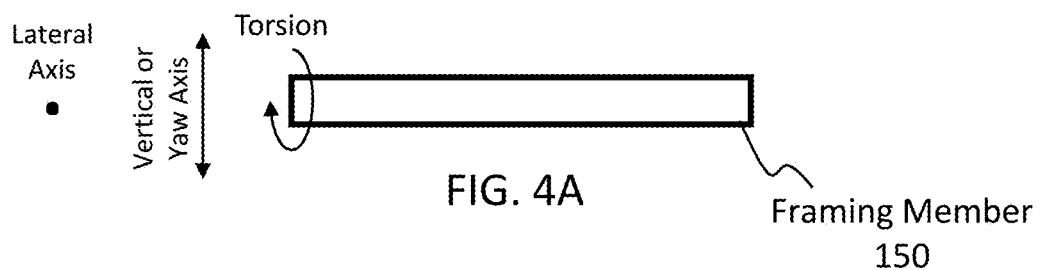
FIGS. 4A-4C are schematics of framing members according to various exemplary embodiments.
Figure 4B:
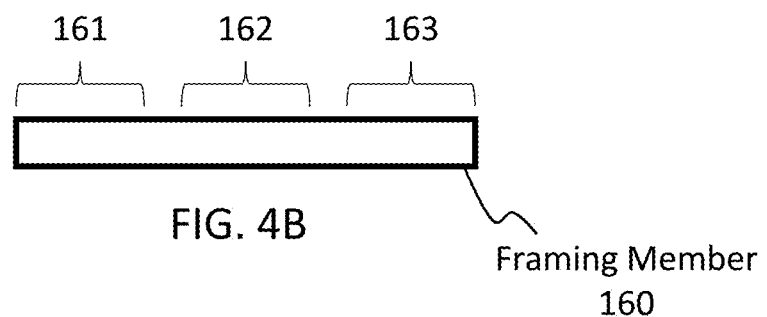
Figure 4C:
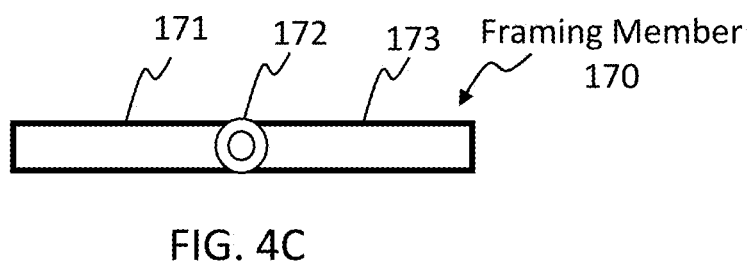

Framing members can be made of a number of different materials, including metals such as steel and aluminum alloys, as well as composite materials such as fiber reinforced polymers. In certain embodiments, thickness and outer dimensions of the framing members will be proportional to the length of those members to preserve the torsional flexibility. In one embodiment shown in FIG. 4A, a framing member 150 is made from a composite material that is strong and rigid in the vertical and lateral axis (lateral axis is shown head-on), yet provides a certain amount of torsional flexibility. In certain embodiments, the degree of torsional flexibility will vary, dependent on a number of factors involved in the system such as weight, balance, application, rotor system dynamics, etc. In certain embodiments, the torsional flexibility should be sufficient so that the assembled fuselage can control the yaw of the system in flight. In certain embodiments, the torsional flexibility should be sufficient so that the assembled fuselage can move between 6 and 20 degrees away from the lateral axis. In one embodiment shown in FIG. 4B, a framing member 160 has a first composite at end portions 161, 163 of the framing member 160 and a second composite at a middle portion 162 of the framing member 160. In certain embodiments, the second composite has greater torsional flexibility than the first composite. In certain embodiments, the first composite has greater torsional flexibility than the second composite. In another embodiment, shown in FIG. 4C, first and second framing member sections 171, 173 are joined by a mechanical element 172 that allows first and second framing member sections 171, 173 to move with a certain degree of independence in a torsional direction, giving the entire framing member a certain degree of torsional flexibility. Tensioned elements known in the art for providing torsional flexibility and a twisting range of motion can be used. In certain embodiments, the mechanical element is adjustable so that the degree and range of torsional flexibility can be manipulated.

Figure 5A:
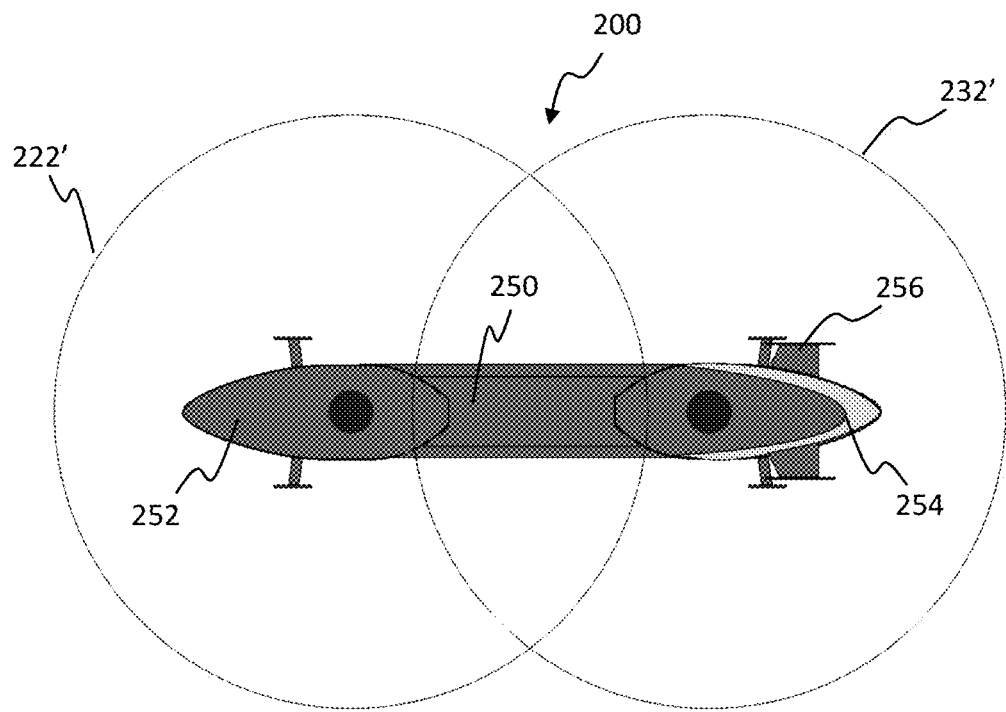
FIG. 5A is a top view of a helicopter having body panels and a tandem rigid rotor system according to an exemplary embodiment.
Figure 5B:
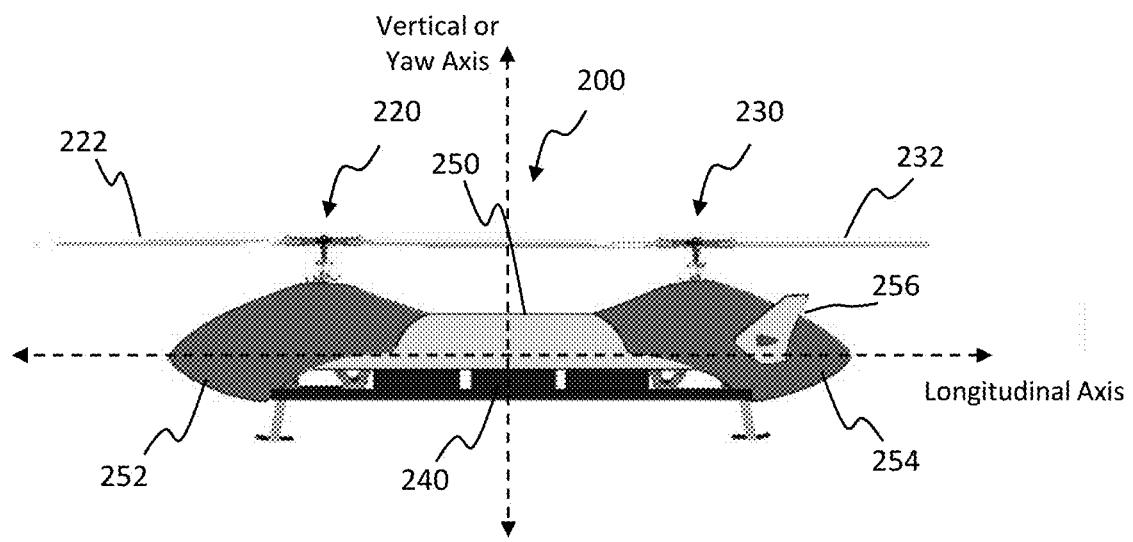
FIG. 5B is a side view of the helicopter shown in FIG. 5A.

Helicopters according exemplary embodiments can be remotely controlled, handheld, unmanned, or full sized to provide for human onboard control with room for passengers and cargo. In one embodiment, shown in FIGS. 5A and 5B, a helicopter 200 has a first rigid rotor system 220 having multiple rotor blades 222, a second rigid rotor system 230 having multiple rotor blades 232, and a fuselage 240 having a torsional flexibility sufficient for controlling yaw of the helicopter 200. In certain embodiments, the first and second sets of rotor blades 222, 232 have a diameter 222', 232' of 45 inches. In certain embodiments rotor blade diameters can range from 6 inches to 100 feet in models ranging from aerial photography models to heavy cargo transport models. A first body panel 250 can be utilized to cover the fuselage. Additional structure can be added in voids of the fuselage without interfering with functional aspects of the fuselage for accommodating mechanical elements of the helicopter, or other structures such as platforms for seating or storage. Second and third body panels 252, 254 can cover front and back nose and tail sections of the helicopter, which may also partially cover the first and second rigid rotor systems 220, 230. These sections can be raised slightly above the fuselage body panel 250, or are otherwise constructed so that they are free to move independently of the fuselage body panel. Other elements such as stabilizers 256 can be added to the surface of the body as needed.

The design according to exemplary embodiments disclosed herein adds flexibility in flight operations. Elements combine to reduce weight, cost and complexity of design, which allows tandem rotor helicopters to utilize rigid rotors to increase control, speed and agility.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. An unmanned tandem rigid rotor system comprising:
   exactly two rigid rotor systems in a tandem configuration, consisting of first and second rigid rotor systems, each comprising exactly one rotor;
   the first rigid rotor system comprising a first plurality of rotor blades;
   the second rigid rotor system comprising a second plurality of rotor blades;
   a control system configured to autonomously control the speed and feather of the first plurality of rotor blades and the second plurality of rotor blades in order to control yaw of the tandem rigid rotor system; and
   a fuselage comprising at least one framing member connecting the first rigid rotor system and the second rigid rotor system, wherein the at least one framing member is torsionally flexible such that the torsional flexibility permits controlling yaw of the tandem rigid rotor system; and
   wherein each framing member of the at least one framing member is directly connected to both of the exactly two rigid rotor systems.

2. The tandem rigid rotor system of claim 1, wherein the at least one framing member remains substantially rigid vertically and laterally.

3. The tandem rigid rotor system of claim 1, wherein the at least one framing member comprises a composite material.

4. The tandem rigid rotor system of claim 1, wherein the at least one framing member is a hollow tube.

5. The tandem rigid rotor system of claim 1 comprising first, second and third body panels;
   wherein the first body panel covers a majority of the fuselage,
   wherein the second body panel covers a portion of the first rotor system,
   wherein the third body panel covers a portion of the second rotor system, and
   wherein the first, second and third body panels move independently of each other such that torsional flexibility of the fuselage is not restricted from controlling the yaw.

6. The tandem rigid rotor system of claim 1, wherein the first plurality of rotor blades and the second plurality of rotor blades are substantially coplanar and are synchronized.

7. The tandem rigid rotor system of claim 1, wherein the first plurality of rotor blades and the second plurality of rotor blades lie in different planes and are asynchronous.

8. The tandem rigid rotor system of claim 1, wherein the exactly two rigid rotor systems are positioned such that the first plurality of rotor blades defines a first volume of rotation that overlaps with a second volume of rotation defined by the second plurality of rotor blades.

9. The tandem rigid rotor system of claim 1, wherein the torsional flexibility allows at least 6 degrees of movement away from a lateral axis of the tandem rigid rotor system.

10. The tandem rigid rotor system of claim 9, wherein the torsional flexibility allows at least 12 degrees of movement away from the lateral axis.

11. The tandem rigid rotor system of claim 10, wherein the torsional flexibility allows at least 20 degrees of movement away from the lateral axis.

\* \* \* \* \*